United States Patent [19]

Mehren et al.

[11] 4,213,396
[45] Jul. 22, 1980

[54] TRAFFIC SYSTEM WITH DRIVE CHANNEL AND ROAD VEHICLES MECHANICALLY CROSS GUIDED-THEREIN

[75] Inventors: Herbert Mehren, Ludwigsburg; Helmut Wulf, Ostfildern, both of Fed. Rep. of Germany

[73] Assignee: Daimler-Benz Aktiengesellschaft, Fed. Rep. of Germany

[21] Appl. No.: 33,807

[22] Filed: Apr. 26, 1979

Related U.S. Application Data

[63] Continuation of Ser. No. 806,592, Jun. 14, 1977.

[30] Foreign Application Priority Data

Jun. 18, 1976 [DE] Fed. Rep. of Germany ....... 2627523

[51] Int. Cl.² .............................................. E01B 26/00
[52] U.S. Cl. ..................... 104/130; 104/247; 180/131
[58] Field of Search ............... 104/130, 245, 247; 180/79, 180, 131; 105/241 C; 414/384, 387

[56] References Cited

U.S. PATENT DOCUMENTS

| 1,888,135 | 11/1932 | McCallen | 105/241 C |
| 3,098,454 | 7/1963 | Maestrelli | 104/247 |
| 3,680,488 | 8/1972 | Donlon | 104/130 |
| 3,712,238 | 1/1973 | Colovas et al. | 104/130 |
| 3,817,186 | 6/1974 | Walsh | 104/246 |
| 3,845,723 | 11/1974 | Jacobs, Jr. et al. | 104/130 |
| 3,872,796 | 3/1975 | Adler et al. | 105/241 C |
| 3,902,428 | 9/1975 | Peveraro | 104/130 |

Primary Examiner—John J. Love
Assistant Examiner—Ross Weaver
Attorney, Agent, or Firm—Craig & Antonelli

[57] ABSTRACT

A public passenger local traffic system with vehicles capable of driving either on streets or guided mechanically transversely in drive channels with at least approximately vertically extending switch guide surfaces being provided within an area of drive channel bifurcations or mergers, which are arranged substantially parallel to the respective outer continuous channel side and point away from the drive channel. The switch guide surfaces serve to guide the vehicles on both sides by means of switch guide rollers which are mounted laterally at the vehicle and having a substantially vertical axis. The switch guide rollers each have an at least approximately vertical roll-off surface in the operating position which cooperates with the switch guide surfaces. The switch guide rollers are supported on switch guide levers whose pivot axes are arranged at least approximately at the same height as the center of the switch guide surface. The roll-off surface of the switch guide-roller, as viewed in vertical cross section, and the switch guide surface, as viewed in cross section, are so profiled relative to one another that the switch guide roller is stabilized during the rolling on the switch guide surface in a center roll height position as a result of the profiling.

32 Claims, 10 Drawing Figures

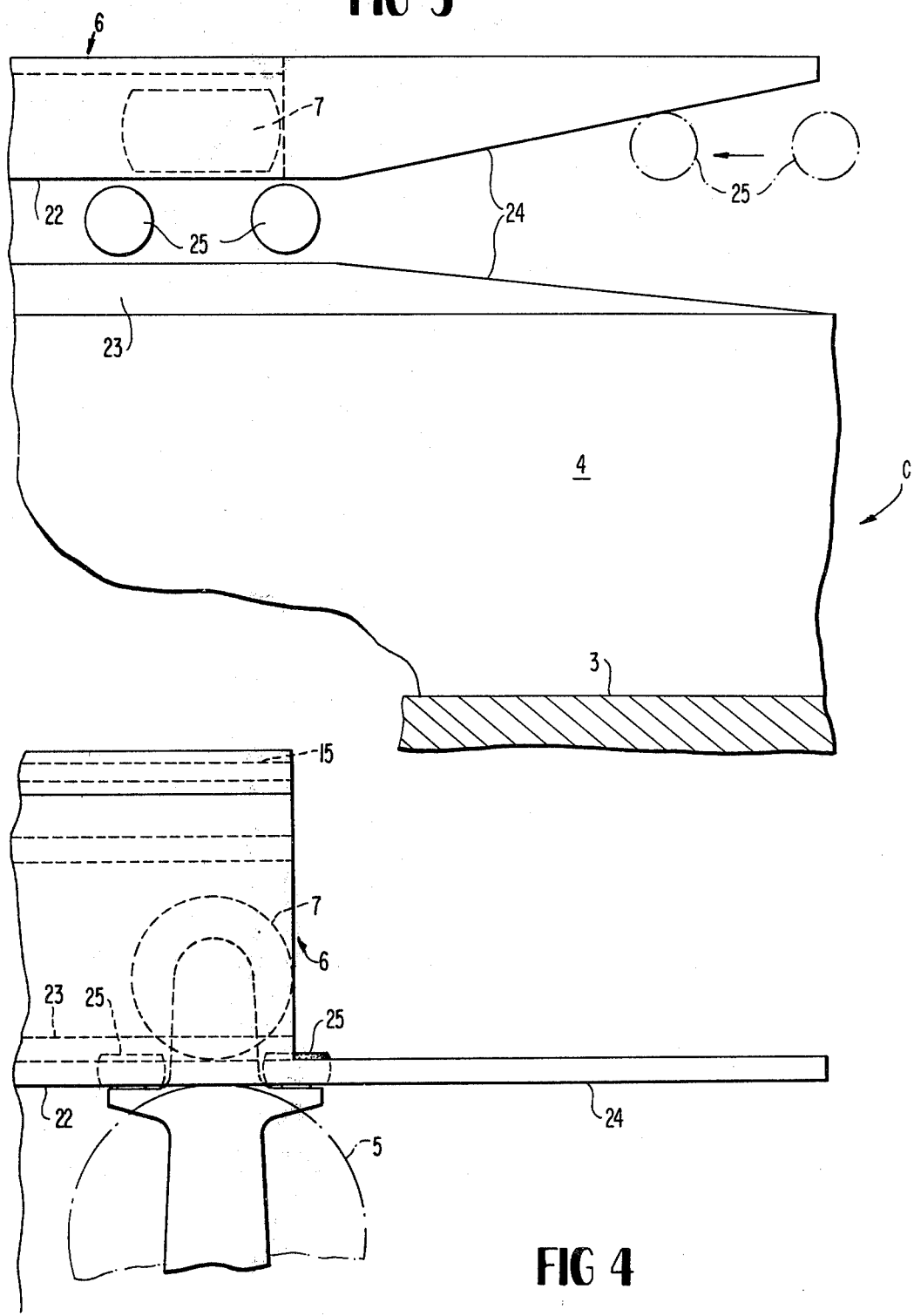

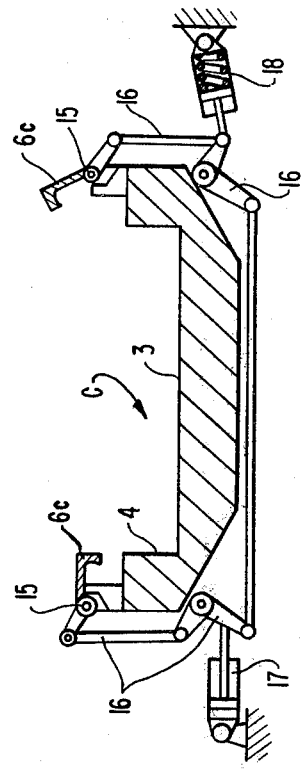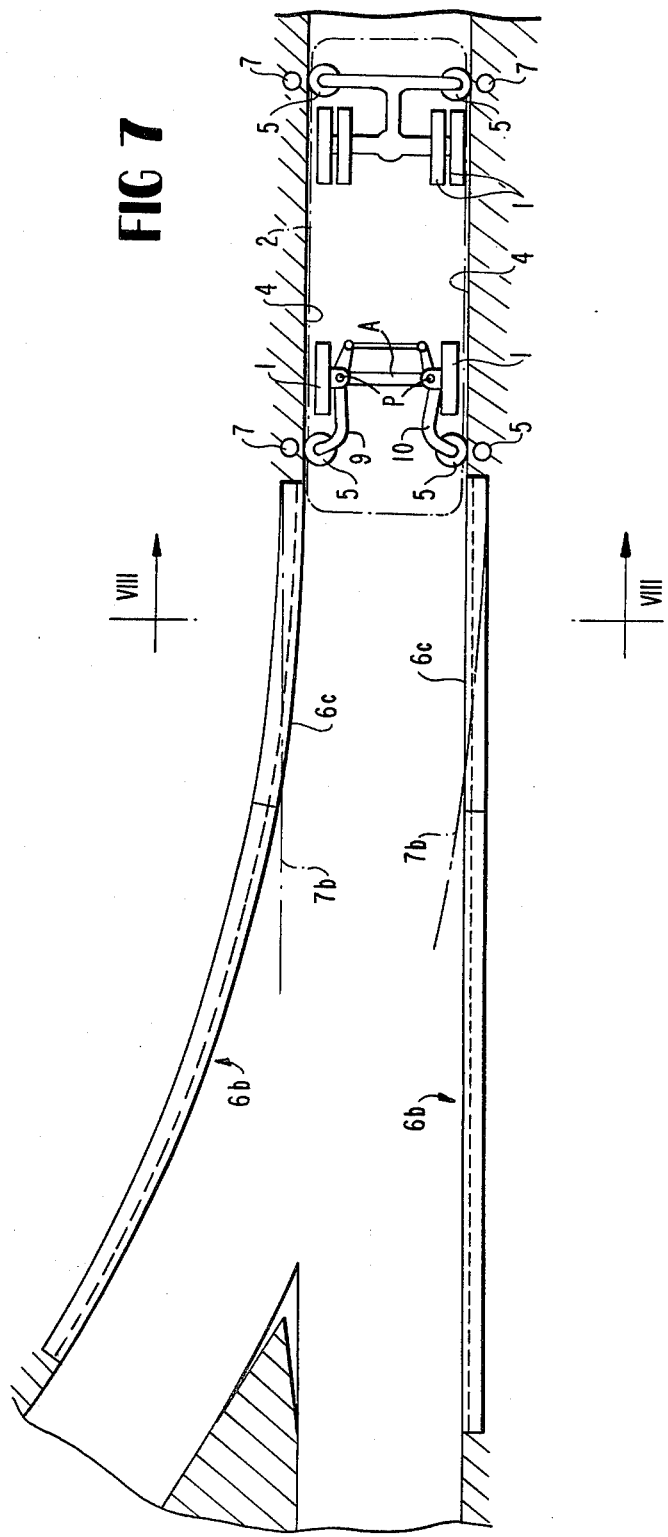

TRAFFIC SYSTEM WITH DRIVE CHANNEL AND ROAD VEHICLES MECHANICALLY CROSS GUIDED-THEREIN

This is a continuation of application Ser. No. 806,592, filed June 14, 1977.

The present invention relates to a traffic system, especially to a public passenger local traffic system, with a drive channel and with vehicles adapted to drive on streets or roads and adapted to be mechanically transversely guided in the drive-channel and with at least approximately vertically extending switch guide surfaces arranged within the area of the drive channel bifurcations or mergers forming switches which are arranged parallelly to the respective continuous outer channel side and point away from the drive-channel, whereby at least one switch guide roller cooperating with the switch guide sufaces and having at least an approximately vertical roll surface and; in the operating position an at least approximately vertical axis of rotation—in the operating position—is provided on each of the two sides of these vehicles, and whereby the switch guide rollers are each supported on a lever, at a switch guide lever which is pivotal about a pivot axis disposed parallel to the driving direction.

Such a traffic system combines the advantages of the purely track-tied traffic with separate line namely, high conveyance performance and great punctuality, small space requirement, and partial automatization capability with the advantages of the trackless road traffic namely, good surface servicing and flexibility under the prerequisite that the vehicles are convertible without difficulty between track and trackless traffic. It is possible to thus realize in the outer areas of the system a good surface service in a flexible manner favorable from a cost point of view as well as to drive in the high density center in a traffic-safe manner on separate narrow tracks.

The constructions of track bifurcations or mergers forming the switches are problematical in the aforementioned traffic system. The switch construction is of importance both as regards the construction of the substructure as also as regards the construction of the vehicle.

The floor height of the vehicle thereby represents a problem by reason of the operationally safe accommodation of the cross guide mechanisms underneath the vehicle floor. In heretofore disclosed solutions to the problem, the switch guide lever extends in the operating position over the switch guide surface from above. The free overlap height, that is, the clear space between the switch guide web and the bottom side of the switch guide lever must thereby be sufficiently large in order to permit, without impairment, all possible vertical movements of the vehicle axle relative to the ground such as, for example, axle-lifting when rolling over uneven ground or axle relief on the inside of the curve by reason of the centrifugal force, tire flattening, tire wear, etc. This not only requires a corresponding high construction of the switch guide surface but also a corresponding strong cranking or offset of the switch guide lever. As a result thereof, the construction of the switch guide lever becomes very high and correspondingly the floor height of the vehicle is also very high at least within the area of this lever, etc. Additionally, should be taken into consideration that in the vertical direction a free space must be provided for spring movements of the body with respect to the axles and the like. By reason of the strong cranking, the lever has to be constructed very heavy which increases the vehicle weight which results in, for example, a high initial cost of the vehicle and greater fuel consumption. Therebeyond, the spring comfort is impaired by reason of the increase of the unsprung masses.

It is the aim of the present invention to improve the aforementioned traffic system to the extent that the structural height of the switch guide lever and its weight becomes smaller.

The underlying problems are solved according to the present invention in that the pivot axes of the switch guide levers are arranged on the vehicle at least approximately at the same height as the center of the switch guide surface inside of the profile of the drive channel, that the roll-off surface of the switch guide roller as viewed in vertical center section and the switch surface—as viewed in cross section—are so profiled corresponding to one another that the switch guide roller is stabilized in a center roll height position on the switch guide surface during the rolling action as a result of the profiling and that the switch guide lever is movable into the operating position.

By reason of such a construction, the switch guide roller can center itself in a center position of the switch guide surface. The switch guide roller which is in engagement, does not partake in the vertical movement of the associated axle and the roll height is also independent of tire flattening and of the wear condition of the tires. This permits a small construction of the switch guide surface and a correspondingly slight cranking of the switch guide lever. The switch guide lever can therefore be constructed relatively flat and lightweight. This is effective favorably on the permissive floor height of the vehicle as well as finally also on the purchase price of the vehicle, on the fuel consumption conditioned on weight and on the spring comfort. The transverse guide installations can be constructed so low that they can be installed without significant changes in already existing buses and above all without changes at supporting parts in existing, proved constructions. Since the switch guide roller, which has a roll-off surface consisting of elastic material, no longer carries out any vertical movements on the web during the rolling, the roll surface wears very much less rapidly than in the prior art constructions. The small construction of the switch guide web permits, as to the rest, a material saving in the substructure of the traffic system.

A circularly shaped or at least circularly like profiling of the switch guide roller and of the web is appropriate because this comes closest to a wear-shape and the profiling then loses least as a result of wear. For purposes of the stabilization of the straight running properties of the roller on the web, attention should be paid to the fact that the curvature of the roller-profiling is larger than that of the web profiling. As a result thereof, the contact between roller and web is concentrated into a narrow area.

As such, the switch guide levers are elastically prestressed in a center position. After overcoming a minimum force, the rollers can yield elastically out of their center position and are returned again into the center position by this spring force. However, in order that the switch guide rollers cannot de-rail, so to speak of, by jerk-like, uncontrollable movements of the vehicle axle when, for example, the vehicle is rolling over a stone or subjected to a sudden braking height guide rails are provided on the side of the substructure and height guide rollers are provided on the side of the vehicle. For purposes of facilitating the threading or introduction into these rails, the latter are enlarged funnel-like at the ends thereof.

The present invention enables, as already mentioned, small switch guide webs. This again opens up the possibility of an active switch since the pivot paths and the masses of the movable switch parts which have to be pivoted are particularly small.

Accordingly, it is an object of the present invention to provide a local traffic system with drive channel and with road vehicles mechanically cross-guided therein which avoids by simple means the aforementioned shortcomings and drawbacks encountered in the prior art.

Another object of the present invention resides in a versatile traffic system utilizing vehicles travelling on roads or in channel-like tracks, which eliminates by simple means the problems encountered heretofore in connection with the bifurcations and mergers of the channels.

A further object of the present invention resides in a traffic system of the type described above which permits without impairment all possible vertical movement of the vehicle axles of the vehicle relative to the ground, yet assures a simple construction of the cross guidance and switch-engaging parts of the vehicle.

Still another object of the present invention resides in a local traffic system of the type described above in which the switch guide lever of the vehicle can be constructed relatively small and lightweight, thereby not only reducing the overall vehicle weight but decreasing the initial cost as well as the fuel consumption of the vehicle.

Another object of the present invention resides in a vehicle construction for a traffic system of the type described above which excels by good fuel consumption and spring comfort.

Still another object of the present invention resides in a traffic system in which the switch guide roller of the vehicle is capable of centering itself in a center position of the switch guide surface.

These and other objects, features and advantages of the present invention will become more apparent from the following description when taken in connection with the accompanying drawing which shows, for purposes of illustration only, several embodiments in accordance with the present invention, and wherein:

FIG. 3 is a partial schematic side elevational view illustrating the construction and arrangement of the height guide rails at the switch guide webs for the coarse guidance of the switch guide lever in accordance with the present invention;

FIG. 4 is a schematic partial top plan view illustrating the construction and arrangement of the height guide rails illustrated in FIG. 3;

FIG. 7 is a schematic top plan view on an active switch arrangement in accordance with the present invention;

FIG. 8 is a schematic cross-sectional view through the active switch of FIG. 7, taken along line VIII—VIII of FIG. 7;

Figure 9:
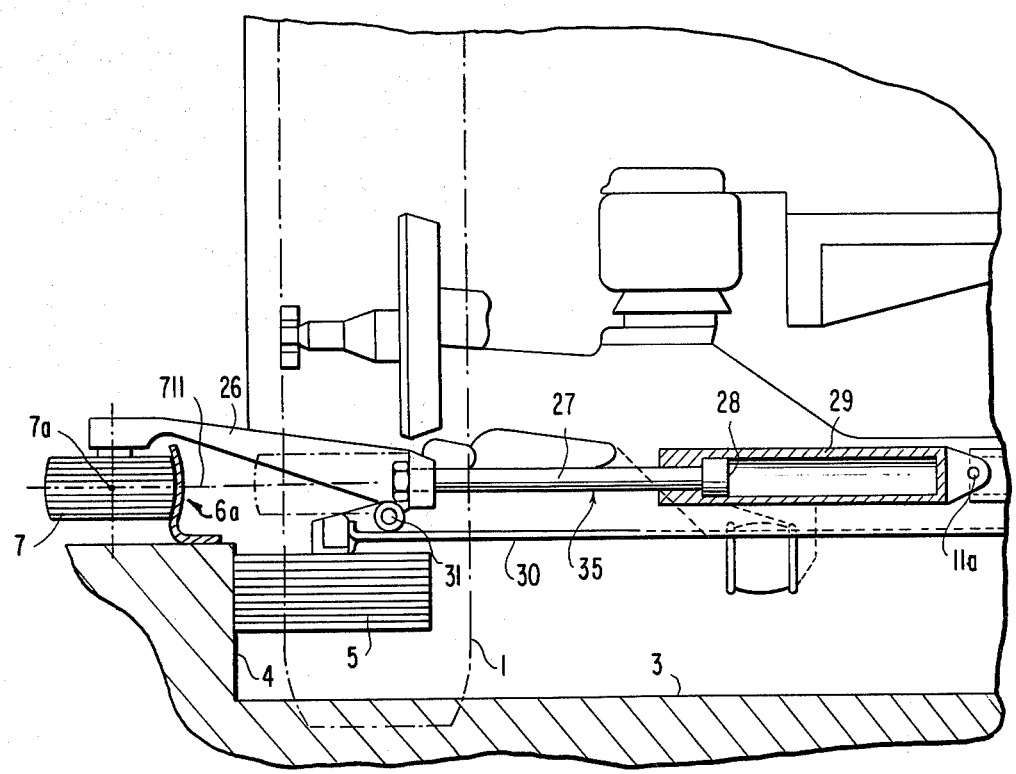
Figure 10:
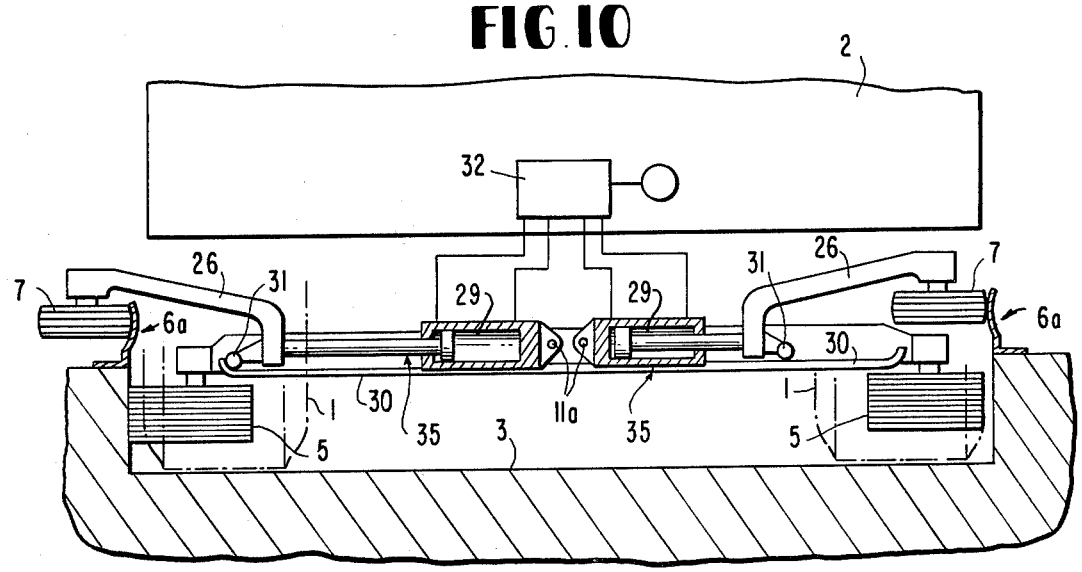

FIG. 9 is a partial schematic end elevational view, partly in cross section, through a further embodiment of an arrangement of switch guide levers in accordance with the present invention, in which the lever can be telescopically extended; and FIG. 10 is a schematic end elevational view, partly in cross section and illustrating a hydraulic shifting arrangement in accordance with the present invention of a pair of oppositely disposed levers according to FIG. 9.

Figure 1:
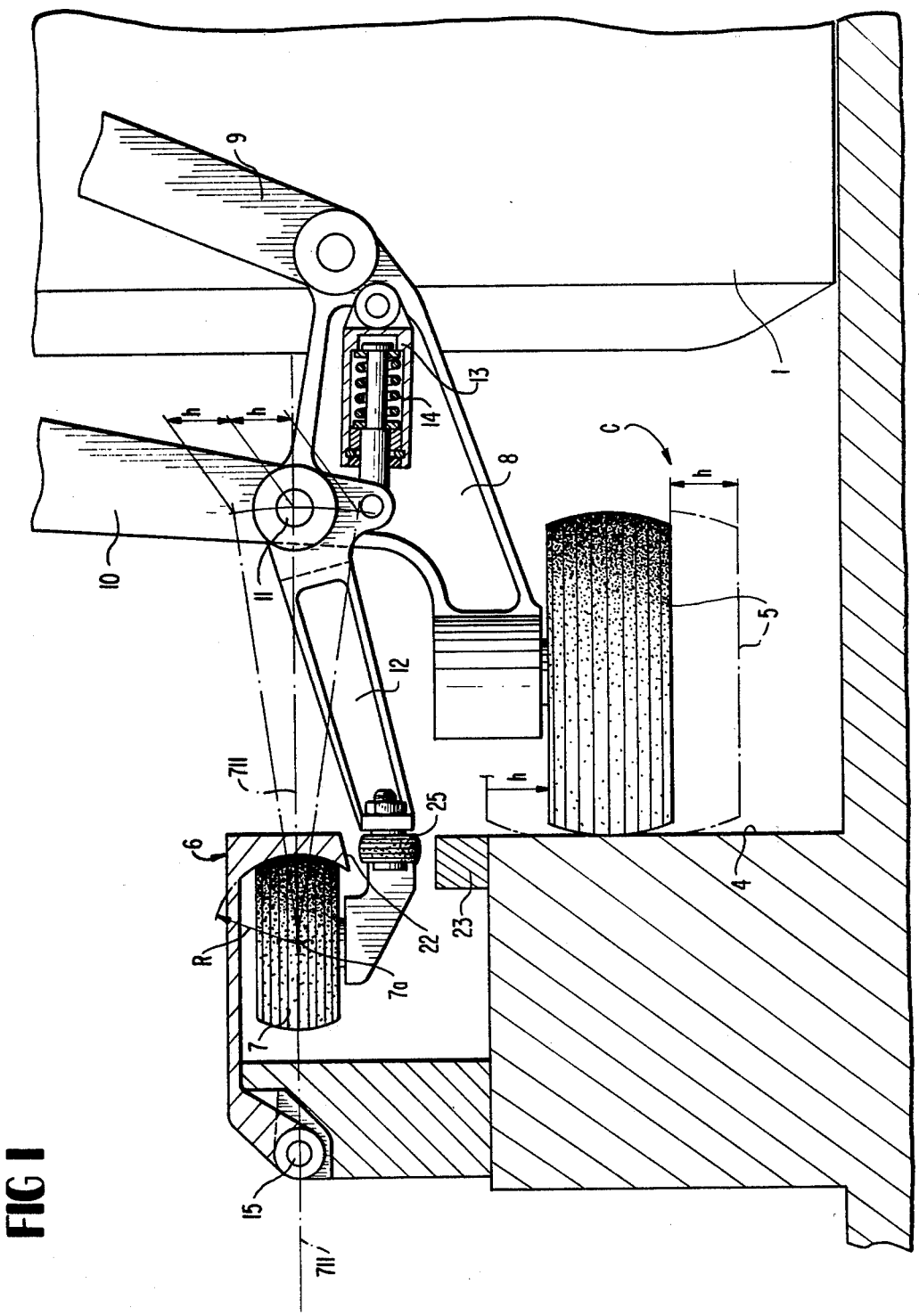
FIG. 1 is a partial schematic end elevational view of an arrangement of a switch guide lever in accordance with the present invention at a vehicle for a vehicle system with active switches, illustrating also the spherical configuration of the switch guide roller and the web thereof.

Referring now to the drawing wherein like reference numerals are used throughout the various views to designate like parts, the traffic system, to which the present invention relates, includes vehicles 2 (FIGS. 5 and 7) provides with air tires 1 and adapted to drive on normal roads or streets as well as to be mechanically transversely guided in the drive channels generally designated by the reference character 6 (FIGS. 1, 2, 3, 6 and 8) having a drive track 3 and cross guide steps or corresponding webs 4. The vehicles 2 can drive on tracks and without tracks. Cross guide rollers 5 (FIGS. 5 and 7) are mounted laterally at the vehicles 2 in front and to the rear thereof for the track-tied drive in the drive channels C which roll-off along the steps or webs 4 and keep the vehicle in its track. Within the area of switches, one web 4 disappears on one side, and in the illustrated embodiment of FIGS. 5 and 7 the inner side disappears so that, within this area, the vehicle 2 is dependent for its two-sided guidance on a switch guide web generally designated by the reference numeral 6 (FIG. 7) or 6a (FIG. 5) as well as on switch guide rollers 7 (FIGS. 5 and 7) mounted on the side of the vehicle 2 adjacent each cross guide roller 5 and adapted to roll off along the switch guide web 6 or 6a. In the embodiments according to FIGS. 1 and 2, the cross guide rollers 5 are arranged retractable at the vehicle for normal road traffic. A cross roller support or carrier 8 (FIG. 1) or 8a (FIG. 2) is held relatively non-yieldingly by way of two levers 9 and 10. The parts 8, 8a, 9 and 10 form a quadrilateral link system together with pivot points P (FIGS. 5 and 7), at the axle A. The cross roller support or carrier 8 or 8a is adapted to be pivoted inwardly after release of a conventional locking mechanism (not shown) and by reason of a corresponding drive or actuation of conventional construction (not shown), whereby by the use of a corresponding joint arrangement the cross guide roller 5 and a switch-guide lever 12 (FIG. 1) or 12a (FIG. 2) pivotally connected at the cross roller carrier 8 or 8a, can be simultaneously lifted. The switch-guide lever 12 or 12a is pivotally connected at the cross roller support or carrier 8 or 8a by way of a pivotal connecting boss or lug 11, with the switch-guide lever 12 or 12a carrying the switch guide roller 7. In FIG. 1, pivotal connecting lug or boss 11 is arranged in the same position as the pivotal connection of the lever 10 with the cross roller support or carrier 8 in order that vertically directed force components on the side of the switch guide lever 12 or 12a cannot exert any moments on the cross roller support or carrier 8. However, the pivotal connecting lug or boss 11 of the lever 12 or 12a is arranged above all at the same height with a center designated 7a of the spherically constructed cross guide roller 7, as indicated by the dash and dotted connecting line 711. The switch guide lever 12 or 12a is elastically held with respect to the cross roller support or carrier 8 or 8a in the illustrated center height position by a piston-like mechanism 13 or 13a. After overcoming a prestress force effected by a spring 14 and the prestress thereof, the switch guide lever 12 or 12a can then be pivoted about the pivotal connecting lug or boss 11 in the upward or downward direction.

Figure 2:
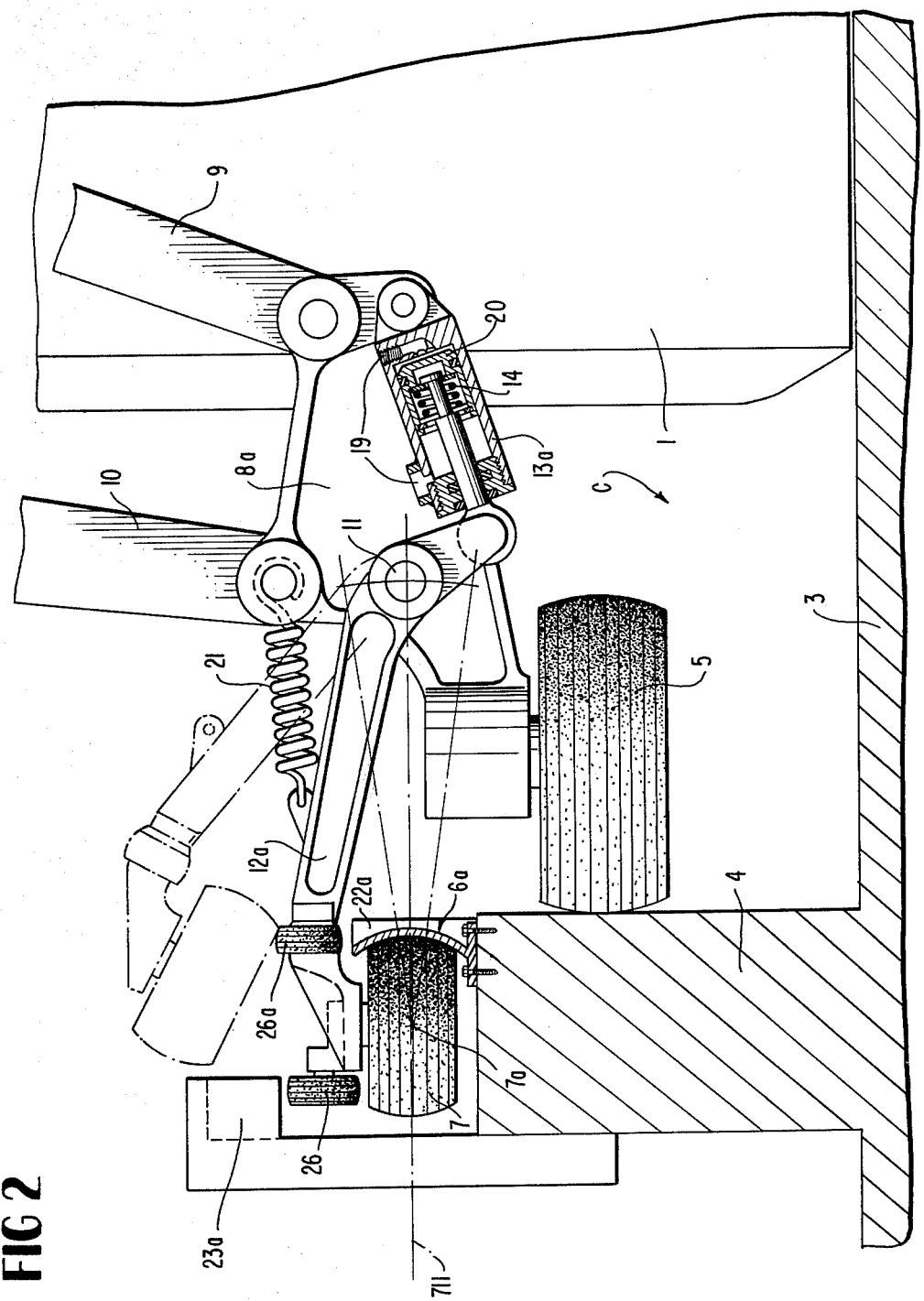
FIG. 2 is a partial schematic end elevational view, similar to FIG. 1, illustrating a modified embodiment of a switch guide lever in accordance with the present invention at a vehicle for a vehicle system with passive switches.

The switch guide roller 7 and the switch guide web 6 or 6a are profiled so as to be self-centering and, for example, are spherically profiled. During height fluctuations (±h) of the vehicle axle with respect to the lever of the drive track 3, in which partake, of course, the cross roller support or carrier 8 or 8a and the pivotel connecting or boss, the height position of the switch guide roller 7 remains preserved without constraint owing to the self-centering profiling and owing to the pivoting possibility of the switch guide lever 12 or 12a. Therefore, switch guide web 6 or 6a can be quite small and narrow. The lever 12 which extends over the switch guide web 6 or 6a therefore has to be correspondingly cranked or offset only relatively slightly and as a result thereof becomes more lightweight a and can be constructed lower and flatter. It makes no difference in that regard whether the switch guide lever 12 or 12a extends from below over a suspended switch guide web 6 (FIG. 1) or extends from above over an upright switch guide web 6a (FIG. 2). The position of the line 711 and of the pivotal connecting lug or boss 11 is indicated in an extreme height position of the axle, for example, when driving over uneven ground on the one hand, or in a particularly low position of the axle which might occur, for example, in case of low tire air pressure or worn tire profile, on the other.

Apart from the aforementioned relatively small pivot possibilities, the switch guide lever 12 is not pivotal in the embodiment according to FIG. 1 with respect to the cross roller support or carrier 8. The switch guide lever 12 always remains in the operationally ready relative position with respect to the cross roller support or carrier 8 so as to provide for a switch passive vehicle. When driving on roads or streets, both the carrier 8 and the lever 12 can be retracted in unison on both sides of the vehicle 2 and can be extended again in unison during the transition to a track-tied drive. In order to enable selectively the passage into the one or the other track at a switch, with the switch passive vehicle construction, the switches in their turn have to be constructed as active switches. For this purpose, according to the embodiment of FIG. 1 and according to the embodiment of FIGS. 7 and 8, a partial web section 6c of the switch guide web 6 is movably arranged along the edge of drive channel C on both sides of the switch. The movable partial web section 6c on the right and on the left are alternately pivotal up or down about a pivot axis 15 located at the same height as the center of the switch guide surface. However, a construction is also feasible within the scope of the present invention, in which the movable partial sections of the switch guide webs are adapted to be laterally pivoted away by way of upright pivot axes arranged within the area of the connection with the immovable switch guide webs 6b or by means of a parallelogram guide link system. The tiltable or pivotal section 6c of the switch guide webs 6 are so coupled with one another by way of a linkage 16 (FIG. 8) that the movement thereof is alternate, i.e., one is pivoted down while the other is pivoted up and vice versa. A switch-actuating device 17 and a dead-center extreme-position-securing device 18 of the toggle type engage at the linkage 16 to assure the retention of the partial web section 6c of the switch guide web 6 in the selected extreme position. The movable web sections 6c of the switch guide web 6 are arranged in those end areas of the switch, in which the switch guide webs 6 or the outer continuous cross guide webs of the drive channel C have the greatest approach to one another, i.e., in the bifurcation at the beginning of the switch and in the merger at the end of the switch. The length of the movable partial web sections 6c is so great that the beginning of the stationary switch guide web 6b which is disposed opposite to the then just effective or operable switch guide section 6c, is located outside of the drive profile of the switch guide rollers 7, as indicated by the dash and dotted line 7b in FIG. 7.

Figure 6:
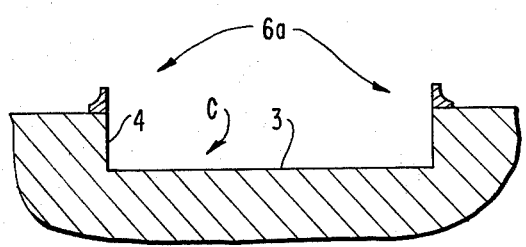
FIG. 6 is a schematic cross-sectional view taken along line VI—VI of FIG. 5.
Figure 5:
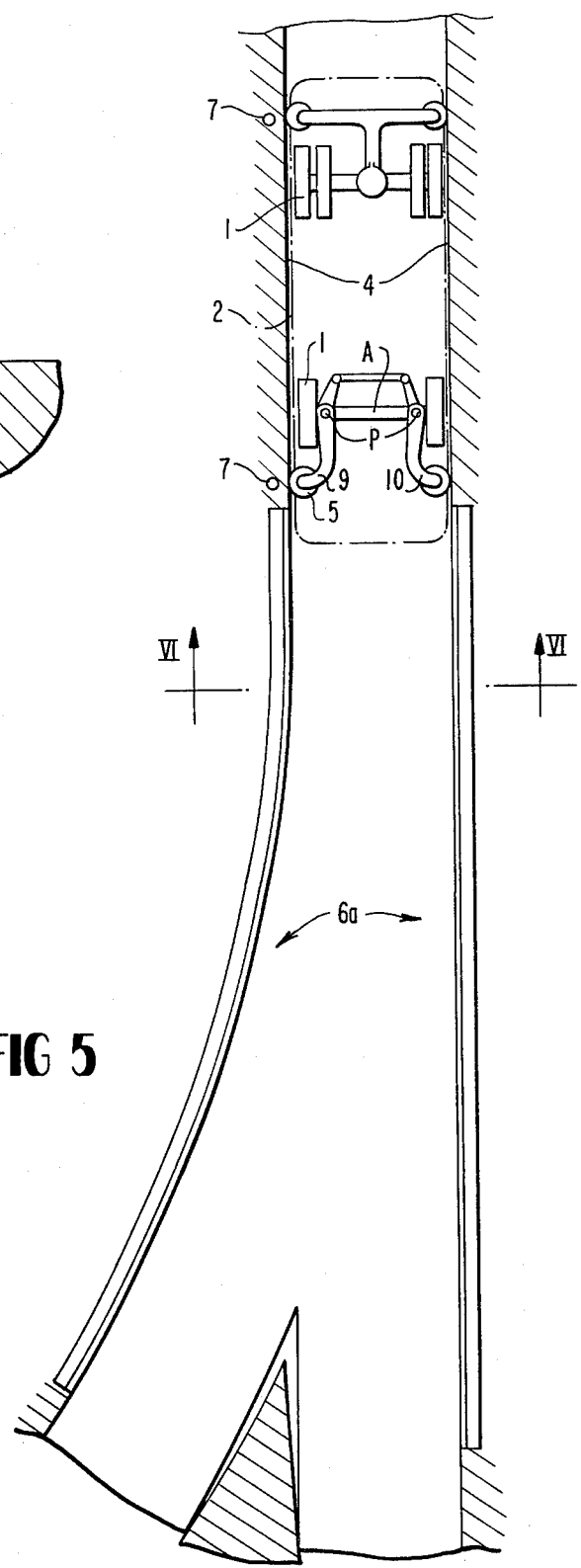
FIG. 5 is a schematic top plan view on a passive switch arrangement in accordance with the present invention.

The embodiment for a traffic system with passive switches and switch-active vehicles according to FIG. 2 and that according to FIGS. 5 and 6 has immovable switch guide webs 6a. In lieu thereof, the switch guide rollers 7 and the corresponding levers 12a are alternately movable up and down on the right and left side of the vehicle 2. For that purpose, the piston-like mechanism 13a forming the centering device is combined with a working piston 20 adapted to be acted upon by connections 19 for supplying hydraulic fluid to working chamber formed on respective sides of the working piston 20 so that the spring centering acts against the respective piston extreme position which is adapted to be hydraulically adduced. In case of a pressure medium loss, the switch guide levers 12a are raised on both sides by the spring 21 into the ineffective position.

In order to assure a safe entry of the profiled switch guide rollers 7 into the correct height position of the switch guide webs 6 or 6a and in order to keep this height position safe against derailment, a pair of height guide rails 22, 23 (FIGS. 1, 3 and 4) or 22a, 23a (FIG. 2) is arranged within the area of the switch guide webs 6 or 6a, which are extended at the inlet side beyond the switch guide web and are enlarged thereat funnel-like so as to form a collecting funnel 24 shown most clearly in FIG. 3.

Corresponding height guide rollers 25 (FIGS. 1, 3 and 4) or 26, 26a respectively cooperate with the height guide rails 22, 23 or 22a, 23a with the height guide roller 25 being arranged adjacent the respective switch guide roller 7 at the end of the switch guide lever 12 and having an axis of rotation disposed transversely to the driving direction. As shown at the right in dash and dotted lines in FIG. 3, the height guide rollers 25 which enter initially eccentrically into the height guide rails, are guided by the guide funnel 24 into the normal height position, as illustrated in full lines on the left in FIG. 3.

In the embodiments of FIGS. 9 and 10 a telescoping switch guide lever generally designated by reference numeral 35 is provided which includes a cross roller support or carrier 36, a piston rod 27, a piston 28 and a working cylinder 29. The switch guide lever 35 is pivotally connected on a pin 11a inwardly at the vehicle, and is arranged approximately at the same height with the center of the switch guide roller 7, as indicated by line 711. An elastically yielding height guide rail 30 which extends in an exit direction, is arranged underneath the switch guide lever 35, along which a support roller 31 secured at the cross roller support of carrier 36 is able to roll-off. The working cylinders 29 of the oppositely disposed switch guide levers 35 of a vehicle 2 are connected with a hydraulic control unit 32 (FIG. 10) of conventional construction. The switch guide lever 35 can be selectively so shifted that the switch guide rollers 7 are either retracted on both sides (when driving normally on a road) or are extended on both sides (when driving in tracks in a network with active switches). In another type of shifting control of the working cylinders 29, a position of the switch guide rollers 7 retracted on both sides—for road traffic—or a position of the switch guide rollers 7 extended on one side only either on the left or on the right—for a track-tied drive in a network with passive switches—can be assumed. A transition from the system with active switches to the system with passive switches is quite possible because the switch guide rollers 7 are movable independently of the cross guide rollers 5.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A traffic system which includes vehicles adapted to be driven on one of roads without tracks or in tracks, the traffic system including drive channel means for forming tracks for a track-tied operation of the vehicles, means for mechanically transversely guiding the vehicles in said drive channel means, switch guide surface means extending at least approximately vertically and pointing away from the drive channel means, the switch guide surface means is arranged substantially parallel to a respective outer side of the drive channel means within an area of one of bifurcations or mergers provided in the drive channel means, switch guide roller means arranged on both sides of the vehicles, said switch guide rollers means having an at least approximately vertical axis of rotation in an operating position and being adapted to cooperate with the switch guide surface means, and switch guide lever means for supporting the switch guide roller means at the vehicles, and means for mounting said switch guide lever means so as to be pivotal about a pivot axis disposed at least approximately parallel to a driving direction of the vehicle, characterized in that the mounting means are so arranged that the pivot axes of the switch guide lever means are at least approximately at the same height as a center of the switch guide roller means, the switch guide roller means include a roll surface cooperable with a surface of the switch guide surface means when the switch guide roller means are in an operative position, the roll surface of the switch guide roller means, as viewed in a vertical cross-section, and the surface of the guide surface means, as viewed in cross-section each have a complementary profile relative to one another so that the switch guide roller means are stabilized in a center roll-off height position during a rolling on the switch guide surface means by the complementary profiles thereof, and in that means are provided for mounting said switch guide lever means at the transversely mechanically guiding means so as to enable the switch guide roller means to execute pivotal motion relative to the transversely mechanically guiding means in a vertical plane when the guiding means is in the operating position.

2. A traffic system according to claim 1, characterized in that each of the vehicles of the traffic system is a public passenger local traffic vehicle.

3. A traffic system according to claim 1, characterized in that the roll surface of the switch guide roller means and the surface of the switch guide surface means cooperable therewith are both constructed in the shape of a circular arc with a center of curvature located outside of a profile of the drive channel means.

4. A traffic system according to claim 3, characterized in that the radius of curvature of the profile of the switch guide surface means is equal to about half a diameter of the switch guide roller means.

5. A traffic system according to claim 4, characterized in that a web means forms the switch guide surface means, and in that a curvature of the profile of the web means is larger than that of a curvature of the profile of the roller guide means.

6. A traffic system according to claim 5, characterized in that at least one height guide roller means having an axis of rotation disposed substantially transversely to a driving direction of the vehicles is arranged on the switch guide lever means, said height guide roller means cooperating with respective height guide rail means.

7. A traffic system with a substructure according to claim 6, characterized in that upper height guide rail means and lower height guide rail means are each provided on a substructure having substantially horizontal roll surfaces.

8. A traffic system according to claim 7 characterized in that upper and lower height guide rail means are arranged within an area of the switch guide surface means for assuring a safe entry of the switch guide roller means into the switch guide surface means, and in that an inlet area of the switch guide surface means, the upper and lower height guide rail means are arranged in an enlarged funnel-like manner.

9. A traffic system according to claim 5, characterized in that means are provided for elastically holding the switch guide lever means in a center position.

10. A traffic system according to claim 9, characterized in that means are provided for mounting the switch guide lever means so as to be operable to pivot exclusively by the height of the switch guide roller means into a position in which the switch guide roller means is located outside of an area of the switch guide surface means.

11. A traffic system according to claim 10, characterized in that an actuating means is provided for selectively actuating the switch guide lever means, the means for elastically holding the switch guide lever means includes a spring centering means combined with the actuating means.

12. A traffic system according to claim 11, characterized in that the actuating means includes a hydraulic cylinder means and working piston means disposed therein, and in that means are provided for operatively connecting the working piston means with the switch guide lever means.

13. A traffic system according to claim 6, characterized in that the means for mechanically transversely guiding the vehicles include cross guide roller means, cross-guide lever means are provided for supporting the cross-guide roller means within an area of a support axle of the vehicles, the cross-guide lever means are operatively connected with the support axle, and in that the switch guide lever means are also supported at the cross-guide lever means.

14. A traffic system according to claim 13, characterized in that the cross guide lever means are constructed and arranged so as to selectively retract and extend the switch guide lever means.

15. A traffic system according to claim 5, characterized in that the switch guide lever means is constructed so as to be telescopically retractable and extendable by a distance equal to at least a diameter of the switch guide roller means along a line extending through the pivot axes of the switch guide lever means and a center of the switch guide roller means.

16. A traffic system according to claim 8, characterized in that means are provided for alternately moving at least a partial length of the two switch guide surface means in at least one of an area of a beginning of the bifurcations or at and end of the mergers into an ineffectual position located outside of a profile of the drive channel means.

17. A traffic system according to claim 1, characterized in that the roll surface of the switch guide roller means and the surface of the switch guide surface means cooperable therewith are both constructed in the shape of a circular arc with a center of curvature located outside of a profile of the drive channel means.

18. A traffic system according to claim 17, characterized in that the radius of curvature of the profile of the switch guide surface means is equal to about half a diameter of the switch guide roller means.

19. A traffic system according to claim 17, characterized in that a web means forms the switch guide surface means, and in that a curvature of the profile of the web means is larger than that of a curvature of the profile of the roller guide means.

20. A traffic system according to claim 1, characterized in that at least one height guide roller means having an axis of rotation disposed substantially transversely to a driving direction of the vehicles is arranged on the switch guide lever means, said height guide roller means cooperating with respective height guide rail means.

21. A traffic system with a substructure according to claim 20, characterized in that upper height guide rail means and lower height guide rail means are each provided on a substructure having substantially horizontal roll surfaces.

22. A traffic system according to claim 1, characterized in that means are provided for elastically holding the switch guide lever means in a center position.

23. A traffic system according to claim 1, characterized in that means are provided for mounting the switch guide lever means so as to be operable to pivot exclusively by the height of the switch guide roller means into a position in which the switch guide roller means is located outside of an area of the switch guide surface means.

24. A traffic system according to claim 23, characterized in that an actuating means is provided for selectively actuating the switch guide lever means, the means for elastically holding the switch guide lever means includes a spring centering means combined with the actuating means.

25. A traffic system according to claim 1, characterized in that the means for mechanically transversely guiding the vehicles include cross guide roller means, cross-guide lever means are provided for supporting the cross-guide roller means within an area of a support of the vehicles, the cross-guide lever means are operatively connected with the support axle, and in that the switch guide lever means are also supported at the cross-guide lever means.

26. A traffic system according to claim 25, characterized in that the cross guide lever means are constructed and arranged so as to selectively retract and extend the switch guide lever means.

27. A traffic system according to claim 1, characterized in that means are provided for alternately moving at least a partial length of the two switch guide surface means in at least one of an area of a beginning of the bifurcations or at an end of the mergers into an ineffectual position located outside of a profile of the drive channel means.

28. A traffic system according to claim 1, characterized in that the switch guide lever means is constructed so as to be telescopically retractable and extendable by a distance equal to at least a diameter of the switch guide roller means along a line extending through the pivot axes of the switch guide lever means and a center of the switch guide roller means.

29. A traffic system including vehicles adapted to be driven on one of roads or on tracks, the traffic system including drive channel means for forming tracks for the vehicles, means for mechanically transversely guiding the vehicles within said drive channel means, two switch guide means extending approximately vertically and arranged within an area of at least one of bifurcations or mergers of the drive channel means, each of the switch guide means are arranged substantially parallel to a respective outer side and point away from the drive channel means, and switch guide roller means having an at least approximately vertical roll surface means provided on both sides of the vehicles and cooperable with the switch guide surface means, characterized in that means are provided for alternately moving at least a partial length of the two switch guide surface means in at least one of an area of a beginning of the bifurcations or at an end of the mergers into an ineffectual position located outside of a profile of the drive channel means; and in that means are provided for mounting the switch guide roller means so as to enable the switch guide roller means to execute pivotal motion when the switch guide roller means are in an operative position cooperable with the guide surface means.

30. A traffic system according to one of claims 6 or 20, characterized in that means are provided for elastically holding the switch guide roller means in a center position relative to the switch guide surface means, and in that an actuating means is combined with the elastically holding means for selectively bringing the switch guide roller means into and out of cooperative engagement with the guide surface means.

31. A traffic system according to claim 29, characterized in that the means for mechanically transversely guiding the vehicles include a cross-guide roller means, cross-guide lever means are provided for supporting the cross-guide roller means within an area of a support axle of the vehicle, and in that the means for mounting the switch guide roller means includes a switch guide lever means pivotally mounted at the cross-guide lever means, and in that the cross-guide lever means are constructed and arranged to retract and extend the switch guide lever means.

32. A traffic system according to claim 20, characterized in that means are provided for alternately moving at least a partial length of the two switch guide surface means in at least one of an area of a beginning of the bifurcations or an end of the mergers into an ineffectual position located outside of a profile of the drive channel means.

* * * * *